[11] 3,620,602

| | | |
|---|---|---|
| [72] | Inventor | Motoaki Kawazu<br>Tokyo, Japan |
| [21] | Appl. No. | 60,698 |
| [22] | Filed | Aug. 3, 1970 |
| [45] | Patented | Nov. 16, 1971 |
| [73] | Assignee | Ricoh Co., Ltd.<br>Tokyo, Japan |
| [32] | Priority | Aug. 2, 1969 |
| [33] | | Japan |
| [31] | | 44/61216 |

[54] VARIABLE-MAGNIFICATION AFOCAL OPTICAL LENS SYSTEM
2 Claims, 13 Drawing Figs.

[52] U.S. Cl............ 350/184, 350/202, 350/218
[51] Int. Cl............ G02b 15/14
[50] Field of Search................ 350/184, 186

[56] References Cited
FOREIGN PATENTS
1,573,473  5/1969  France ..................... 350/184
1,248,325  8/1967  Germany ............... 350/184

*Primary Examiner* — John K. Corbin
*Attorneys* — Henry T. Burke, Robert Scobey, Robert S. Dunham, P. E. Henninger, Lester W. Clark, Gerald W. Griffin, Thomas F. Moran, R. Bradlee Boal, Christopher C. Dunham and Thomas P. Dowd ABSTRACT: A variable-magnification afocal optical lens system for use in combination with a focusing lens system such as used in small motion-picture cameras and projectors, having, for example, a focal length of 15.5 mm., back focal length of 11.0 mm., f-number of 1.8 and maximum image height of 3.5 mm., to permit varying the focal length from 10 to 30 mm. with a back focal length of 11.0 mm. and f-number of 1.8. The afocal system comprises an array of seven elements in three groups with the second group consisting of cemented positive and negative meniscus lenses and an individual negative meniscus lens, having strong diverging power with a compound focal length of −18.88 mm., so that the image errors of the first group are well compensated and the image errors of the whole system are minimized upon shifting, thus permitting the system to be made as compact as a conventional afocal lens system.

FIG. 3A  FIG. 3B  FIG. 3C
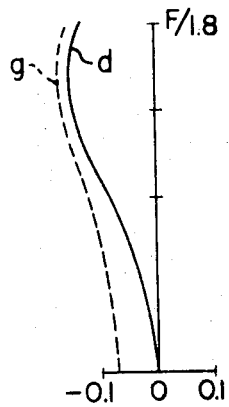
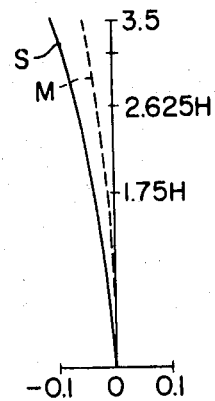
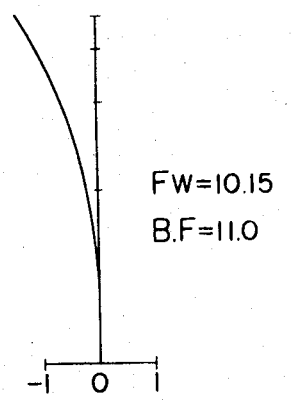
FW=10.15
B.F=11.0
FIG. 4A  FIG. 4B  FIG. 4C
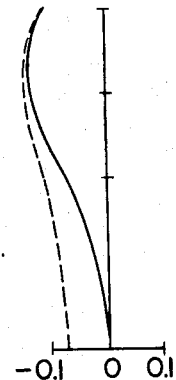
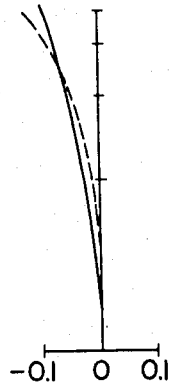
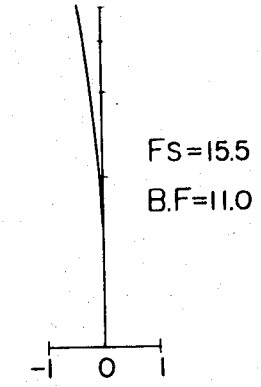
FS=15.5
B.F=11.0
FIG. 5A  FIG. 5B  FIG. 5C
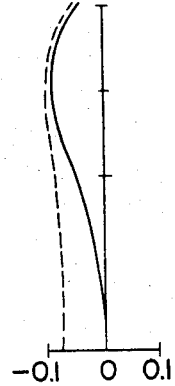
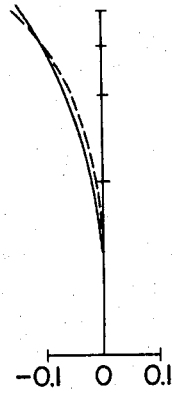
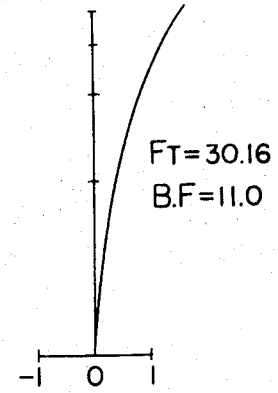
FT=30.16
B.F=11.0
INVENTOR
MOTOAKI KAWAZU

VARIABLE-MAGNIFICATION AFOCAL OPTICAL LENS SYSTEM

BACKGROUND OF THE INVENTION

The present invention relates to a variable-magnification afocal optical lens system and more particularly to a variable-magnification optical lens system of the type to be used in combination with a photographic lens of a motion picture camera employing 8-mm film to permit varying of the compound focal length as in the case of a zoom lens.

Variable-focal-length afocal lens systems should be simple in construction, compact in size and light in weight in view of their use, and generally consist of three groups of lenses. The conventional lens system of this type, however, tends to vary its image errors, especially spherical aberration, widely in the shifting. It is therefore desirable to provide such a lens system having the above-mentioned advantages but which minimizes the image errors due to shifting.

The present invention accordingly provides a variable-magnification afocal optical lens system whose image errors are minimized in the shifting and which is still simple in construction, compact in size, light in weight and inexpensive to manufacture as compared with the conventional lens systems of this type.

SUMMARY OF THE INVENTION

The present invention comprises the construction of the second group, of the three groups of lenses of the optical system, of a positive and a negative meniscus lens cemented together and an individual negative meniscus lens in an arrangement satisfying certain conditions whereby the second group has a strong diverging power which greatly contributes to the compensation of the image errors caused in the first group, resulting in a minimum variation in image errors upon shifting.

The present invention will become more apparent from the following description of the preferred embodiment thereof taken in conjunction with the accompanying drawings.

BRIEF DESCRIPTION OF THE DRAWINGS

FIGS. 3A–C, 4A–C and 5A–C respectively show the spherical aberration, astigmatism and distortion curves at the minimum, medium and maximum focal lengths of the system consisting of the afocal lens system shown in FIG. 1 and attached to the photographic lens system of the type having characteristics as shown in FIG. 2.

DESCRIPTION OF THE PREFERRED EMBODIMENT

Figure 1:
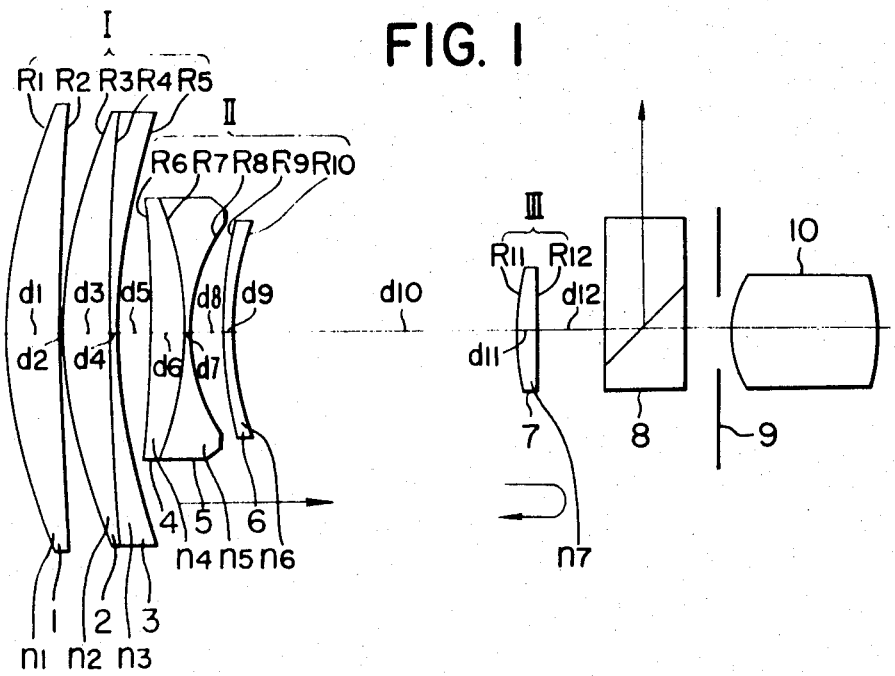
FIG. 1 is a schematic view of a variable-focal-length optical lens system in accordance with the present invention.

In FIG. 1 there is shown a preferred embodiment of a variable-magnification afocal optical system in accordance with the present invention comprising an array of three lens groups, indicated as I, II and III. The first group I is a converging system consisting of a positive meniscus lens 1 and cemented negative-power lenses 2 and 3; the second group II is a variator system which may be shifted axially in the array and consists of a combination of two cemented lenses 4 and 5 and a negative meniscus lens 6; and the third group III is a converging system consisting of a planoconvex lens 7. The third group III is a nonlinear system for mechanically compensating the focal point shift due to the shift of the variator system of group II. The individual lenses of the system shown in FIG. 1 satisfy the following conditions.

| | | | |
|---|---|---|---|
| $R_1 = -44.36$ | $d_1 = 4.7$ | $n_1 = 1.62041$ | $v_1 = 60.3$ |
| $R_2 = 404.16$ | $d_2 = 0.1$ | | |
| $R_3 = 41.755$ | $d_3 = 4.2$ | $n_3 = 1.62041$ | $v_3 = 60.3$ |
| $R_4 = -293.2$ | $d_4 = -0.85$ | $n_4 = 1.76182$ | $v_4 = 26.5$ |
| $R_5 = -57.173$ | $d_5 = -23-23.7$ | | |
| $R_6 = 116.5$ | $d_6 = 3.0$ | $n_6 = 1.75520$ | $v_6 = 27.5$ |
| $R_7 = -29.525$ | $d_7 = 0.7$ | $n_7 = 1.62041$ | $v_7 = 60.3$ |
| $R_8 = 18.19$ | $d_8 = 3.0$ | | |
| $R_9 = 66.855$ | $d_9 = 0.8$ | | |
| $R_{10} = 25.053$ | $d_{10} = 25.462 - 3.667$ | $n_{10} = 1.62041$ | $v_{10} = 60.3$ |
| $R_{11} = -36.03$ | $d_{11} = 1.4$ | | |
| $R_{12} = \infty$ | $d_{12} = 6.319 - 6.714$ | $n_{12} = 1.63854$ | $v_{12} = 55.5$ | where
R indicates the radius of curvature of the various lens surfaces which are identified by the subscript in accordance with the numbering in FIG. 1; the surfaces being numbered consecutively from front to rear (left to right) and with a plus radius indicating a surface convex toward the front and a minus radius indicating a surface concave toward the front.

d indicates the thickness of a lens or the distance along the axis of the airspace again as identified by the subscripts in FIG 1, the numbering of the thicknesses and air spaces running from front to rear;

n indicates the refractive index of the particular lens identified by the respective subscript; and v indicates the Abbe's number of the particular lens identified by the respective subscript for the D-line of helium.

The remainder of the optical system comprises a semitransparent mirror 8 (7 mm. in thickness) a stop 9 and a focusing lens 10 with a focal length of 15.5 mm., a back focal length of 11.00 mm., F-number of 1.8 and a maximum image height of 3.5 mm., which are respectively disposed to the rear of the third lens group III. With this arrangement, a variable-magnification optical system with a variable focal length from 10 to 30 mm., a back focal length of 11.0 mm. and F-number of 1.8 is provided.

Figures 2A, 2B, 2C:
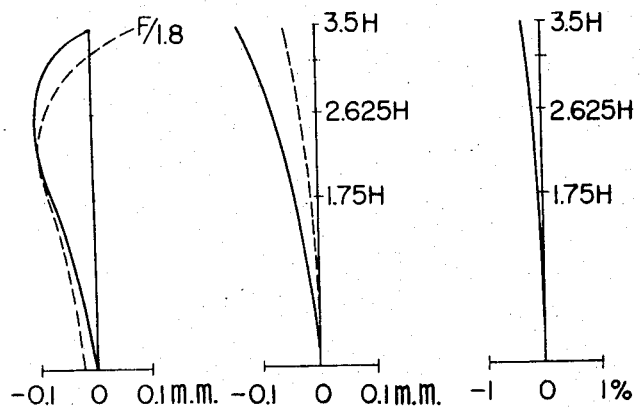
FIG. 2A, FIG. 2B and FIG. 2C respectively show the spherical aberration, astigmatism and distortion curves of a particular photographic lens to be used with the afocal lens system shown in FIG. 1.

When the image errors of the focusing lens system 10 are as shown in FIGS 2 A–C, those of the overall optical system (the afocal optical system plus the focusing lens system) will be as shown in FIGS 3 A–C, 4 A–C, and 5 A–C, respectively, for the minimum, intermediate and maximum focal lengths of system.

Now with the second group II having a compound focal length $f_{II}$ of 18.88 mm which exhibits an extremely strong diverging power, it becomes possible to compensate the image errors of the first group I by suitably selecting the combinations of simple lenses in the second group II. It has been found that the following conditions if fulfilled, will compensate for the image errors of the first group:

$$7.0 < R_6/R_8 < 8.0 \quad (1)$$

$$0.9 < R_8/f_{II} < 1.2 \quad (2)$$

$$3.0 < R_9/f_{II} < 4.0 \quad (3)$$

$$1.2 < R_{10}/F_{II} < 1.5$$

The conditions (1) and (2) if fulfilled will eliminate the spherical aberration and astigmatism of the first group within the whole range of magnification while the condition (3) will produce the positive and negative 6 distortion needed for correction.

The seidel coefficients of aberrations of the given compound optical system are as follows:

| | ΣSI | ΣSII | ΣSIII | ΣSIV | ΣSV |
|---|---|---|---|---|---|
| Focusing lens system | 0.498 | 0.138 | −0.132 | 0.537 | 0.147 |
| $F_W = 10.15$ | 0.834 | 0.335 | −0.163 | 0.228 | 0.517 |
| $F_S = 15.5$ | 0.503 | 0.337 | −0.136 | 0.349 | 0.522 |
| $F_T = 30.16$ | 0.194 | 0.153 | −0.001 | 0.676 | −1.427 | where   ΣSI = coefficient of spherical aberration,
ΣSII = coefficient of coma;
ΣSIII = coefficient of astigmatism,
ΣSIV = coefficient of curvature of image field,
ΣSV = coefficient of distortion;
$F_W$ = the shortest compound focal length in mm.
$F_S$ = the intermediate compound focal length in mm.; and $F_T$ = the longest compound focal length in mm.

The distances of the airspaces between the lens groups are determined by the following relationships $$d_{10} = 55.412 + \frac{18.885 \, (54.146 - d_5)}{d_5 - 35.262}$$

$$d_{12} = 34.754 - (d_5 + d_{10})$$

It will therefore be seen that an improved variable magnification afocal optical lens system is presented which is simple in construction, compact in size and light in weight, but which minimizes the image errors due to shifting.

While a preferred embodiment of the invention has been set forth, it will be understood by those skilled in the art that certain modifications may be made in the construction, arrangement and general combination of elements, such as proportionately reducing or increasing the radii of curvature of the lens surfaces and the thicknesses and spacing of the lenses without departing from the spirit and scope of the invention.

What is claimed is:

1. A variable magnification afocal optical lens system of seven simple lens elements divided into three groups comprising respectively from front to rear:
    a. A first group consisting of a positive meniscus lens and positive and negative meniscus lenses cemented together;
    b. a second group constituting a linearly movable diverging variator system comprising a positive and a negative meniscus lens cemented together and a negative meniscus lens; and
    c. a third group constituting a nonlinear converging system, for mechanically compensating for the focal point shift due to the shifting of said second group, consisting of a positive planoconvex lens; and wherein the characteristics of the elements of said optical system satisfy the following relations:
    d. the ratio of the radii of curvature of the front surface and the rear surface of the cemented lenses of the second group is greater than 7 and less than 8;
    e. the ratio of the radius of curvature of said rear surface of the cemented lenses of the second group and the compound focal length of the second group is greater than 0.9 and less than 1.2.
    f. the ratio of the radius of curvature of the front surface of the rearward negative meniscus lens of the second group and the compound focal length of the second group is greater than 3 and less than 4; and
    g. the ratio of the radius of curvature of the rear surface of the rearward negative meniscus lens of the second group and the compound focal length of the second group is greater than 1.2 and less than 1.5

2. A variable magnification afocal optical lens system of seven simple lens elements divided into three groups comprising respectively from front to rear:
    a. a first group consisting of a positive meniscus lens and positive and negative miniscus lenses cemented together;
    b. a second group constituting a linearly movable diverging variator system comprising a positive and a negative miniscus lens cemented together and a negative miniscus lens; and
    c. a third group constituting a nonlinear converging system, for mechanically compensating for the focal point shift due to the shifting of said second group, consisting of a positive planoconvex lens; and wherein the characteristics of the elements of said optical system satisfy the following relations:
    d. the radii of curvature of the successive surfaces are related in the respective proportions 44.36:404.16:41.755:293.2:57.173:136.5:29.525:18.19:66.855:25.053:36.93 and infinity
    e. the lens thicknesses and spacings along the optical axis are related in the respective proportions 4.7:0.1:4.2:0.85:23 to 23.7:3.0:0.7:3.0:0.8:25.462 to 3.667:1.4: and 6.319 to 6.714.
    f. The indices of refraction of the successive lenses are related in the respective proportions 1.62041:1.62041:1.76182:1.75520:1.62041 1.62041 1.63854
    g. the Abbe's numbers of the respective lenses are 60.3:60.3:26.5:27.5:60.3:60.3:55.5.

* * * * *